US007684499B2

(12) United States Patent
Schley-May (10) Patent No.: US 7,684,499 B2
(45) Date of Patent: Mar. 23, 2010

(54) MULTI-BAND LINE INTERFACE CIRCUIT WITH LINE SIDE CANCELLATION

(75) Inventor: James T. Schley-May, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 1203 days.

(21) Appl. No.: 11/216,769

(22) Filed: Aug. 30, 2005

(65) Prior Publication Data

US 2007/0047664 A1    Mar. 1, 2007

(51) Int. Cl.
   H04B 3/00    (2006.01)
   H04L 5/16    (2006.01)
   H04M 9/00    (2006.01)
(52) U.S. Cl. .................. 375/258; 375/220; 379/399.01
(58) Field of Classification Search ................ 375/220, 375/257–258, 295, 318, 377; 330/252, 75; 379/387.01, 399.01, 402, 403
See application file for complete search history.

(56) References Cited

U.S. PATENT DOCUMENTS

| | | | |
|---|---|---|---|
| 3,586,881 A | 6/1971 | Gaunt, Jr. | |
| 3,617,645 A | 11/1971 | Gumley | |
| 3,955,052 A | 5/1976 | Orbach | |
| 4,103,118 A | 7/1978 | Bergman | |
| 4,380,690 A | 4/1983 | Matsufuji et al. | |
| 4,429,299 A | 1/1984 | Kabat et al. | |
| 5,109,409 A | 4/1992 | Bomgardner et al. | |
| 5,133,006 A | 7/1992 | Khuat | |
| 5,426,697 A | 6/1995 | McGrane | |
| 5,515,433 A | 5/1996 | Chen | |
| 5,712,977 A | 1/1998 | Glad et al. | |
| 5,790,656 A | 8/1998 | Rahamim et al. | |
| 5,856,980 A * | 1/1999 | Doyle ......................... | 714/704 |
| 5,901,210 A | 5/1999 | Schley-May | |
| 5,970,088 A * | 10/1999 | Chen ........................... | 375/222 |
| 6,067,316 A | 5/2000 | Amrany et al. | |
| 6,163,579 A | 12/2000 | Harrington et al. | |
| 6,169,792 B1 | 1/2001 | Schley-May | |
| 6,172,992 B1 | 1/2001 | Hoffmann | |
| 6,359,972 B1 | 3/2002 | Schott et al. | |
| 6,400,772 B1 | 6/2002 | Chaplik | |
| 6,445,791 B1 * | 9/2002 | Grisamore et al. .......... | 379/402 |
| 6,731,752 B1 | 5/2004 | Chaplik et al. | |
| 6,792,104 B2 | 9/2004 | Schley-May | |
| 6,850,618 B1 | 2/2005 | Mohajeri et al. | |
| 6,956,944 B1 * | 10/2005 | Koren .................... | 379/406.01 |
| 6,996,379 B2 * | 2/2006 | Khorram ...................... | 455/91 |
| 7,031,458 B2 * | 4/2006 | Holcombe et al. ...... | 379/399.02 |
| 7,127,062 B2 * | 10/2006 | Casier et al. ................. | 379/402 |
| 7,260,142 B2 * | 8/2007 | Warke ......................... | 375/222 |

(Continued)

OTHER PUBLICATIONS

PCT/US2006/034125 filed Aug. 29, 2006, PCT International Preliminary Report on Patentability, mailed Mar. 13, 2008.

(Continued)

*Primary Examiner*—Khanh C Tran
(74) *Attorney, Agent, or Firm*—Blakely, Sokoloff, Taylor & Zafman LLP (57) ABSTRACT

A line interface circuit with line side cancellation of a communication device is described herein. In one embodiment, a communication device includes a line interface circuit for interfacing a communication line. The line interface circuit includes a driver for driving multiple transmitting signals onto the communication line over multiple transmitting frequency bands. The line interface circuit further includes multiple transmitting filters each corresponding to one of the transmitting frequency bands. Other methods and apparatuses are also described.

22 Claims, 10 Drawing Sheets

U.S. PATENT DOCUMENTS

| | | | |
|---|---|---|---|
| 7,298,838 B2 * | 11/2007 | Oswal et al. | 379/406.04 |
| 2002/0141570 A1 * | 10/2002 | Sun et al. | 379/387.01 |
| 2003/0179858 A1 | 9/2003 | Bella et al. | |
| 2004/0068759 A1 * | 4/2004 | Sheehy et al. | 725/147 |

OTHER PUBLICATIONS

PCT International Search Report and PCT Written Opinion of the International Searching Authority, PCT/US 06/34125 filed Aug. 29, 2006, mailed Apr. 9, 2007.

U.S. Appl. No. 10/382,171, filed Mar. 4, 2003, James T. Schley-May.

Wikipedia®, "ITU G.992.1", http://en.wikipedia.org/wiki/ITU_G.992.1, Jul. 6, 2007, 10 pages.

Wikipedia®, "Asymmetric Digital Subscriber Line", http://en.wikipedia.org/wiki/Asymmetric_Digital_Subscriber_Line, Aug. 20, 2007, 7 pages.

Wikipedia®, "ITU G.993.1", http://en.wikipedia.org/wiki/ITU_G.993.1, May 19, 2007, 1 page.

Wikipedia®, "Very High Speed Digital Subscriber Line", http://en.wikipedia.org/wiki/Very_High_Speed_Digital_Subscriber_Line, Aug. 23, 2007, 5 pages.

PCT Notification of Transmittal of International Preliminary Examination Report (IPER), mailed Jan. 7, 2004, pp. 1 total.

* cited by examiner

MULTI-BAND LINE INTERFACE CIRCUIT WITH LINE SIDE CANCELLATION

FIELD OF THE INVENTION

Embodiments of the invention generally relate to a communication device. Specifically, this disclosure relates to a line interface circuit with line side cancellation of a communication device.

BACKGROUND

Generally, it is a requirement of a communication system to separate transmit and receive signals so that as much as possible of the transmit band signals are cancelled from the receive band signals.

For example, in an xDSL (x digital subscriber line, where "x" represents a variety of DSL technologies) line interface circuit, a portion of that circuitry known as the "hybrid", or 2-to-4 wire converter cancels noise in the xDSL line interface circuitry. In some hybrid circuits it may be difficult to achieve enough noise cancellation to meet acceptable performance for the line interface circuit. A reason for this difficulty can be the fact that the transmission line may be limited to sensing the line impedance through the mandatory coupling transformer, and the line coupling transformer has less than ideal properties that alter the perception of the line impedance. The most significance of these properties may be the magnetizing and leakage inductances. To a lesser effect, linearity can be another non-ideal property that alters the perception of the line impedance.

Figure 1:
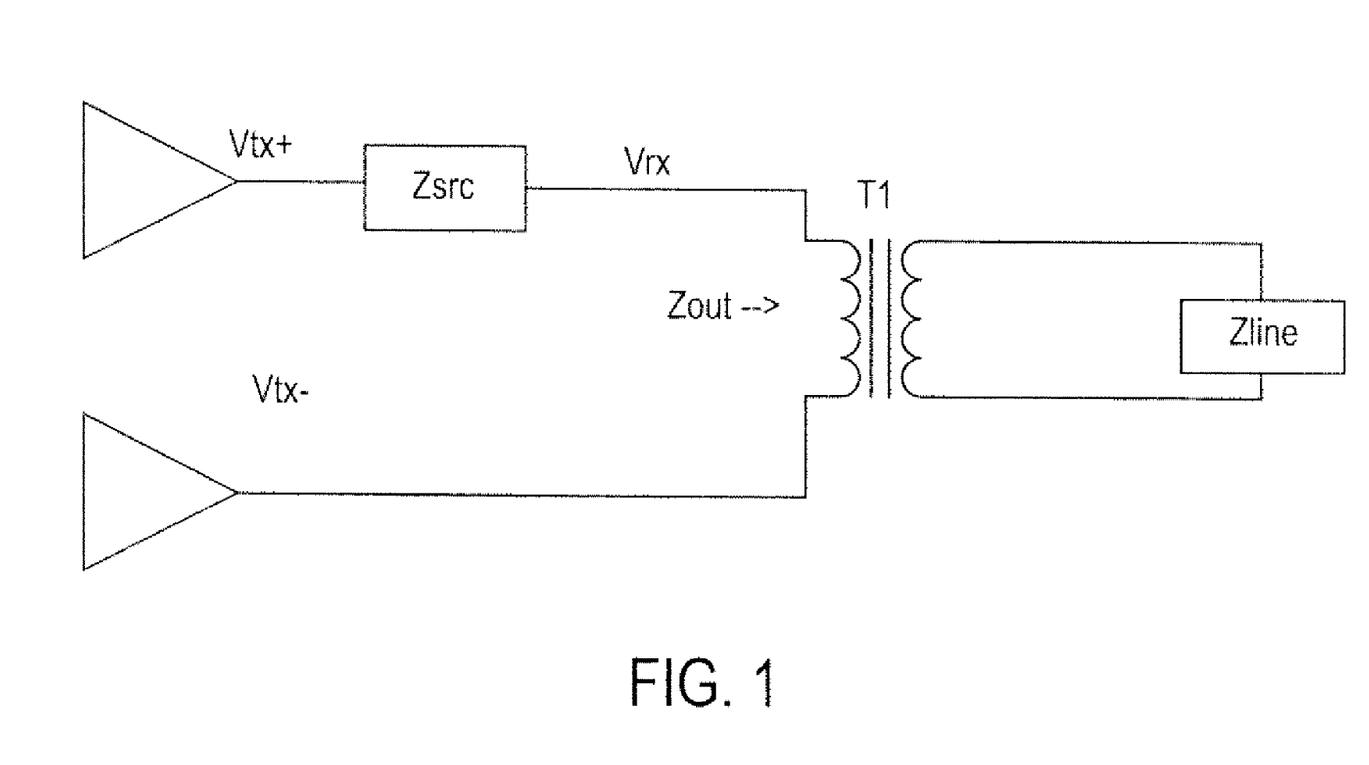
FIG. 1 is a simplified hybrid circuit.

FIG. 1 shows a simplified hybrid circuit. All node voltages are with respect to ground. Vtx+ and Vtx− make up a complimentary differential transmit signal, and Vrx is the receive signal. Trans-hybrid loss, or THL, can be defined as the magnitude of Vrx with respect to Vtx when the line is silent, thus, no receive signal is being received. Vtx can be either the Vtx+ signal or the Vtx− signal since each has the same magnitude.

If T1 was assumed to be an ideal 1:1 transformer and if a matching impedance Zsrc perfectly equaled Zline under all conditions, then a perfect voltage divider is formed, exactly splitting the differential transmit signal in half. Vtx+ and Vtx− can be thought of as plus and minus 1 (unity); therefore, the voltage on Vrx would be zero under these ideal conditions. However, the transformer may have significant magnetizing and leakage inductances and thus cannot be thought of as ideal. Further, the impedance matching source Zsrc may not perfectly equal Zline under all conditions. Thus, a perfect voltage divider under all conditions may not exist for such a hybrid circuit. In fact, the presence of the leakage and magnetizing inductances cause significant degradation of the cancellation, as a function of frequency. Therefore, some prior hybrid circuits suffer limitations including poor cancellation of the transmit signal from the receive signal.

However, for other systems such as very high bit-rate Digital Subscriber Line (VDSL) where there are multiple transmit bands and/or multiple receive bands, there can be a ratio of 400-500 between highest and lowest transmit frequencies. One problem with the conventional approaches, which use a single transformer to couple all bands to the line, is that the leakage inductance of practical transformers limits the high frequency response if the primary inductance is large enough to support the lowest band.

SUMMARY OF THE DESCRIPTION

A line interface circuit with line side cancellation of a communication device is described herein. In one embodiment, a communication device includes a line interface circuit for interfacing a communication line. The line interface circuit includes a driver for driving multiple transmitting signals onto the communication line over multiple transmitting frequency bands. The line interface circuit further includes multiple transmitting filters each corresponding to one of the transmitting frequency bands.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

A line interface circuit with line side cancellation of a communication device is described herein. In the following description, numerous specific details are set forth, such as examples of specific signals, named components, connections, number of windings in a transformer, example capacitances and inductances, etc., in order to provide a thorough understanding of the present disclosure. It will be apparent, however, to one of ordinary skill in the art that the present disclosure may be practiced without these specific details. In other instances, well known components or methods have not been described in detail but rather in a block diagram in order to avoid unnecessarily obscuring the present disclosure.

Further specific numeric references such as first leg, may be made. However, the specific numeric reference should not be interpreted as a literal sequential order but rather interpreted that the first leg is different than a second leg. Thus, the specific details set forth are merely exemplary. The specific details may be varied from and still be contemplated to be within the spirit and scope of the present disclosure. The term coupled is defined as meaning connected either directly to the component or indirectly to the component through another component.

Throughout this application, a DSL modem is used as an example of a communication device to illustrate embodiments of the disclosure. It will be appreciated that other communication devices, such as network interface card (NIC) or cable modem may be applied.

Figure 2:
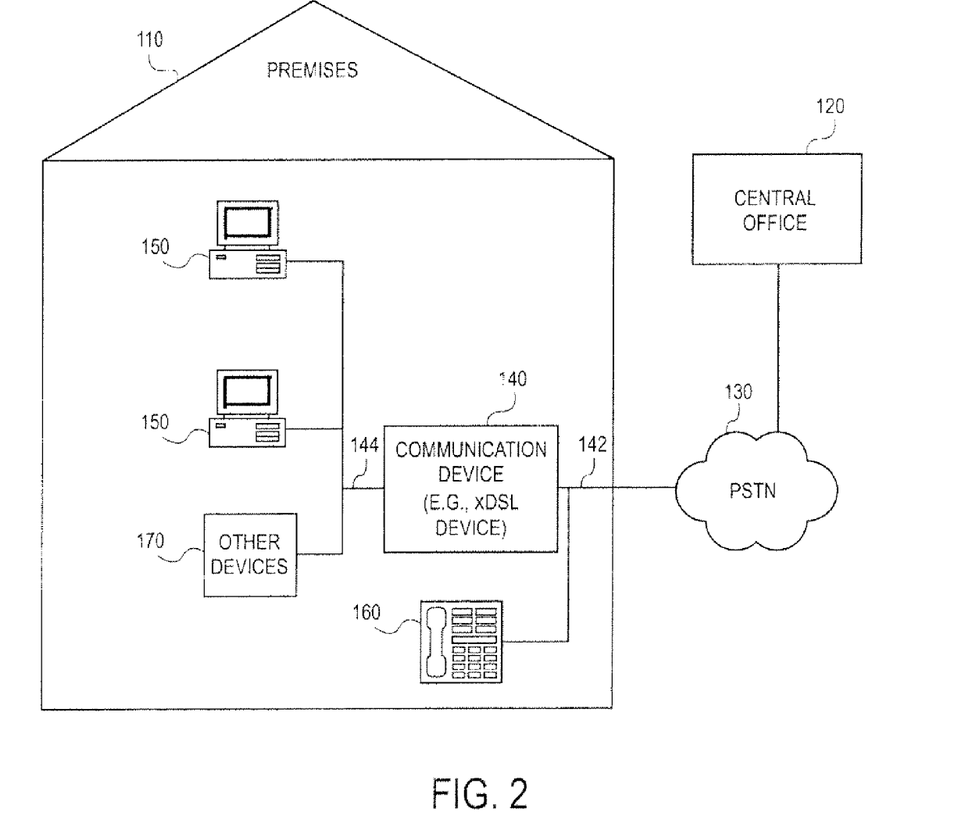
FIG. 2 illustrates a block diagram of a communication system which may be used with an embodiment of the invention

FIG. 2 illustrates a block diagram of an embodiment of a communication system having a communication device that includes a line interface circuit. According to one embodiment, a system example includes a premises 110, having property with any type of structure, may couple via a line 142 to a Public Switched Telephone Network (PSTN) 130 that provides copper wires as a telecommunications medium and can also include Cat 5 copper cables (not shown) and fiber optic cables (not shown). PSTN 130 may further couple to a central office 120, which provides telecommunications services for a particular area. Central office 120, operated by a service provider (not shown), provides switching technology for Plain Old Telephone Service (POTS), Integrated Services Digital Network (ISDN) service, and/or xDSL service.

In premises 110, a communication device 140, such as a DSL compatible modem or router, communicates via line 142 with PSTN 130 and via a path 144 with multiple other telecommunication devices. The telecommunication devices include, but are not limited to, computer 150 with network/telecommunication hardware and/or software (not shown) and other devices 170, such as set-top boxes, home network gateways, PDAs (Personal Digital Assistants), and printers. A telephone 160 may couple to line 142 and includes a filter, such as a low pass filter (not shown), for filtering out non-POTS band signals. Other POTS devices, such as a facsimile machine, may also couple to line 142.

TIP and RING can be the names for the two wires that constitute the twisted pair wire connection between the PSTN telephone and the PBX (Private Branch exchange) equipment and the central office. This twisted pair may be referred to as the local loop or subscriber loop.

Communication device 140 includes a line interface circuit that is able to transmit and/or receive multi-band signals with relatively low interferences from each other. In one embodiment, the line interface circuit may include multiple filters, such as, for example, band-pass filters, where each filter is coupled to one of the multiple transmit and/or receive bands. In a particular embodiment, a transmit filter may be an odd order band-pass filter with at least three orders. In addition, each band may be associated with a transformer specifically designed for the corresponding band (e.g., transmit/receive frequency). In a particular embodiment, a transformer may be implemented as a part of a component of the corresponding transmit filter, for example for isolation purposes. Furthermore, the transmit filters may be implemented in a bridge configuration such that the transmit signals may be nulled to the receive nodes that receive the receiving signals.

Figure 3:
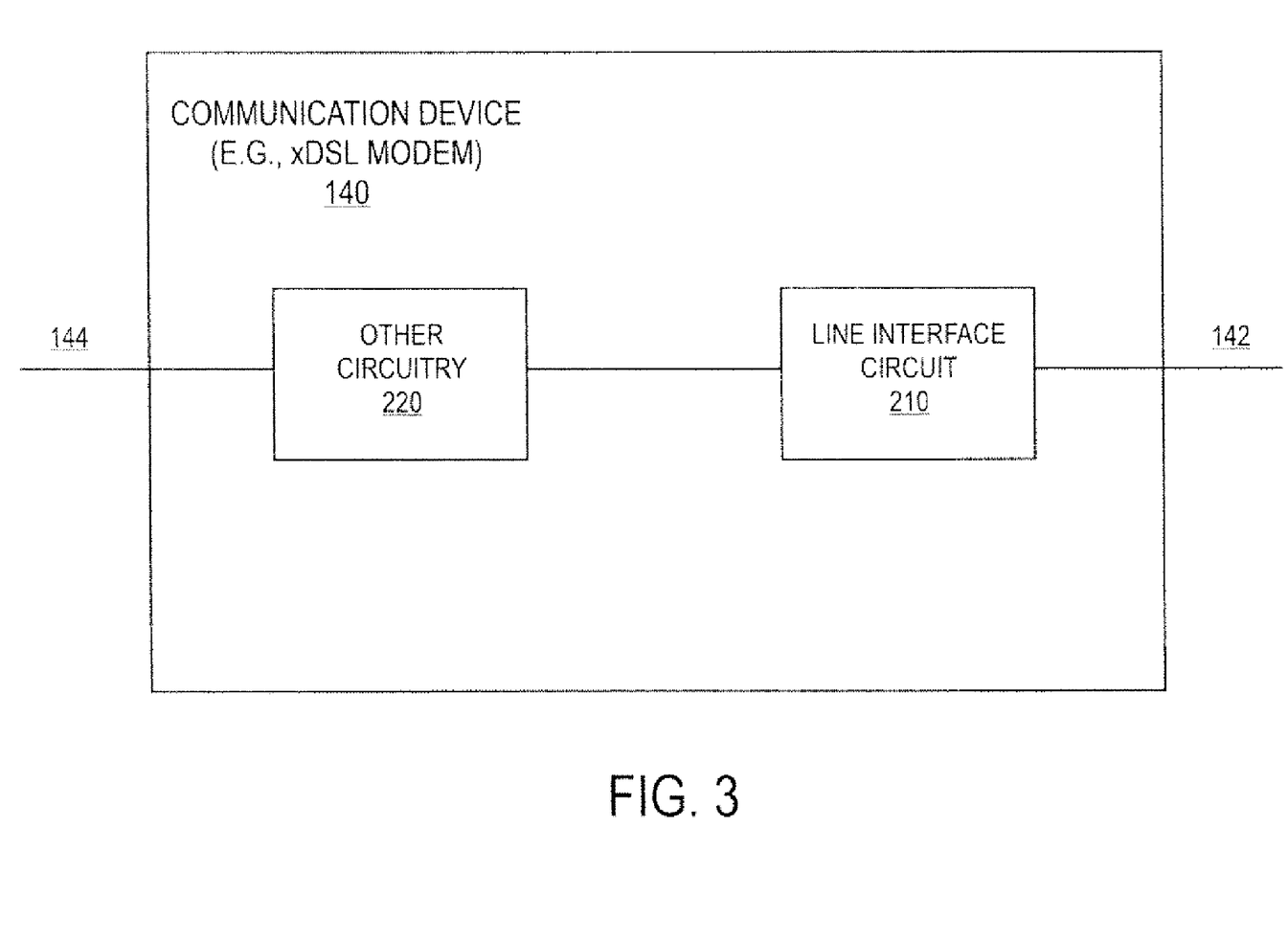
FIG. 3 is a diagram of a communication device in accordance with one embodiment of the invention.

FIG. 3 is a schematic diagram of a communication device according to one embodiment of the invention. For example, communication device 140 may be an xDSL device used as communication device 140 of FIG. 2. In one embodiment, xDSL device 140 includes, but is not limited to, a line interface circuit 210 (e.g., a hybrid circuit) and other xDSL circuitry 220. Line interface circuit 210 may be, for example, a 2-to-4 wire converter that electromagnetically couples xDSL device 140 to line 142. Other xDSL circuitry 220, which includes filters and a transceiver, communicates via path 144 with computers 150 and other device 170. Other components may also be included.

Figure 4A:
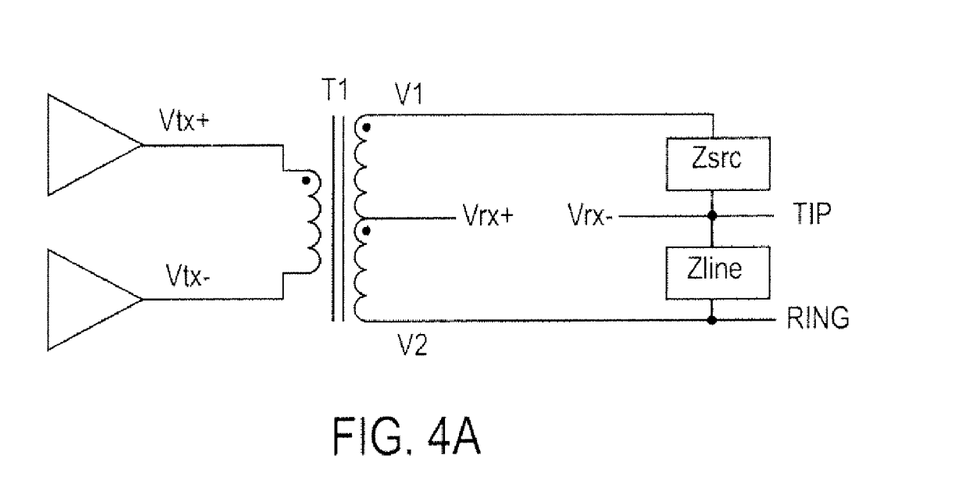
FIGS. 4A-4C are schematic diagrams of certain embodiments of line interface circuits.
Figure 4B:
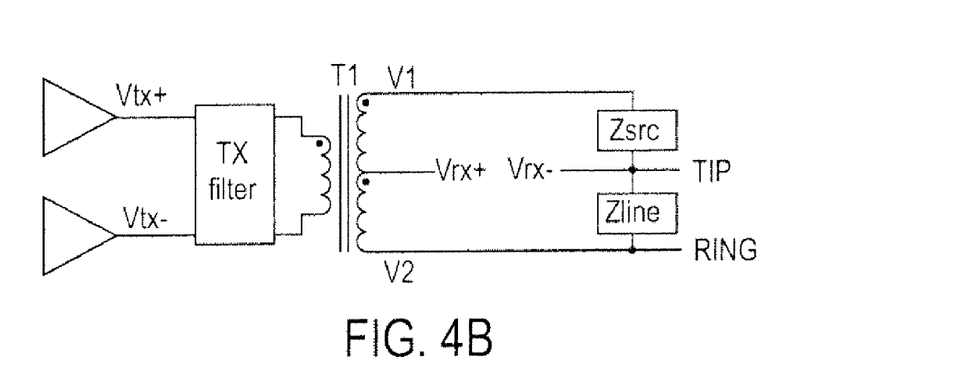
Figure 4C:
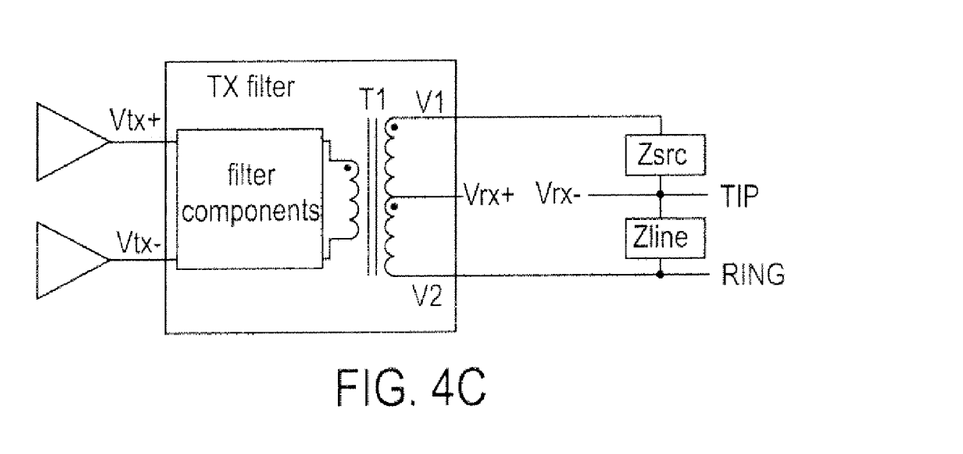

FIGS. 4A-4C show bridge configurations of a hybrid line interface circuit according to certain embodiments of the invention. Referring to FIG. 4A, the line side windings of T1 are equal so that V1 and V2 are symmetrical and equi-potential about Vrx+, and Zsrc matches the impedance Zline seen across TIP and RING. Under these conditions, the bridge nulls out the transmit signal as seen by receive signals Vrx+ and Vrx−. This configuration works very well for Asymmetric Digital Subscriber Line (ADSL) where there is just one upstream band and one downstream band. As shown in FIG. 4B, there may be a transmit filter inserted between transmit driver outputs Vtx+ and Vtx− and the primary winding of transformer T1 to further assist in isolating the two bands. As shown in FIG. 4C, transformer T1 may be an integrated part of the transmit filter, with the inductance of its primary winding acting as part of the filter.

Figure 5A:
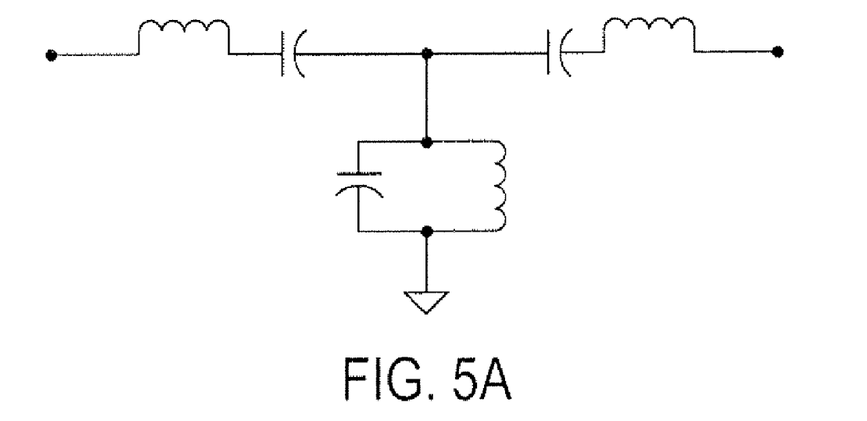
FIGS. 5A-5D are schematic diagrams of certain embodiments of filters used in a line interface circuit.
Figure 5B:
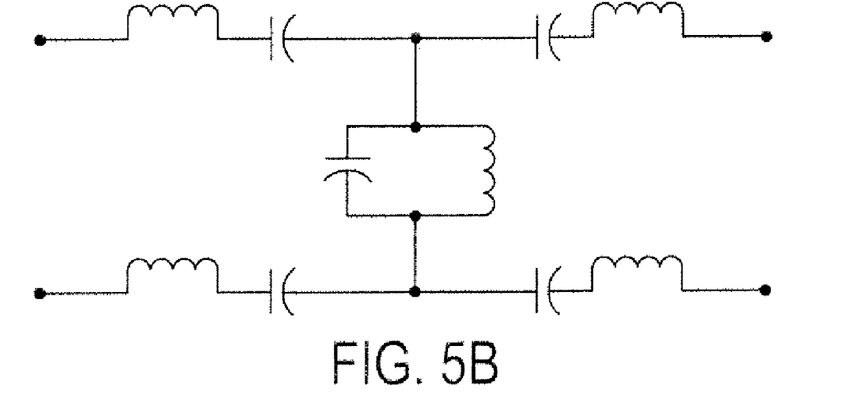
Figure 5C:
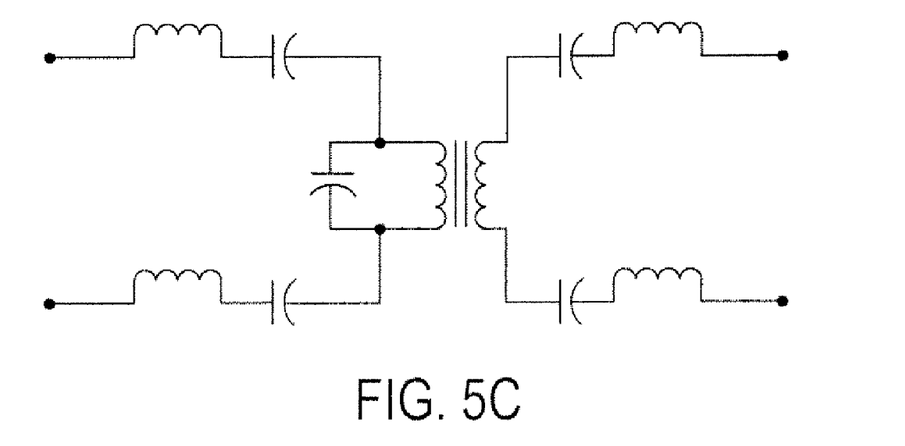
Figure 5D:
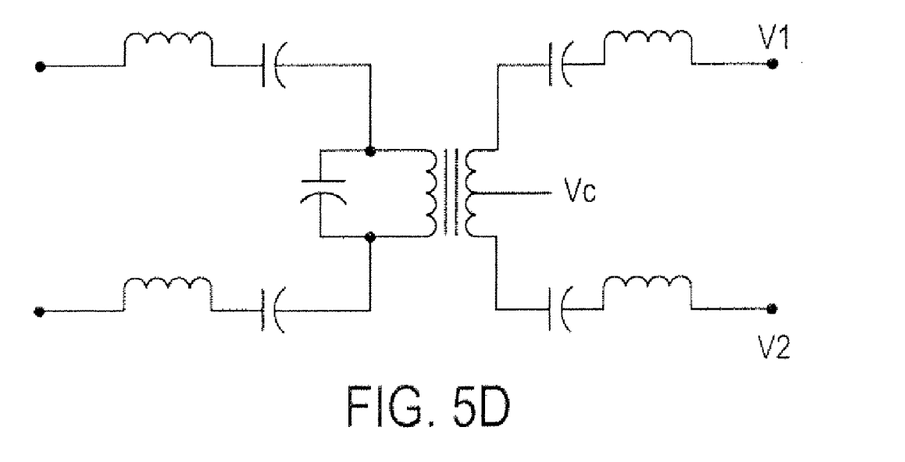

FIGS. 5A-5D are schematic diagrams illustrating certain embodiments of filters that may be used in a line interface circuit. For example, the filters shown in FIGS. 5A-5D may be used as any one of the filters shown in FIGS. 4A-4C. FIG. 5A shows a single ended third order band-pass filter. High-pass and low-pass filters are considered as subsets of this structure. FIG. 5B is a balanced differential version of the filter shown in FIG. 5A. FIG. 5C is an equivalent filter as the one shown in FIG. 5A, with the center inductor changed to a transformer with equivalent inductance. The transformer may provide some or all of TNV isolation. FIG. 5D is a filter similar to one shown in FIG. 5C, except that the transformer has been center tapped. It can be seen that if the filter is terminated symmetrically with respect to Vc and the output legs are impedance balanced, V1 and V2 are equi-potential symmetrical about Vc.

Note that throughout this application, a band-pass filter is shown for illustration purposes only. It will be appreciated that other types of filters (e.g., low-pass or high-pass filters) may also be utilized. Further, for purposes of illustration, an LC (inductive/capacitive) component is used as a component of a band-pass filter. It will be appreciated that other types of components may also be utilized in a band-pass filter.

Figure 6:
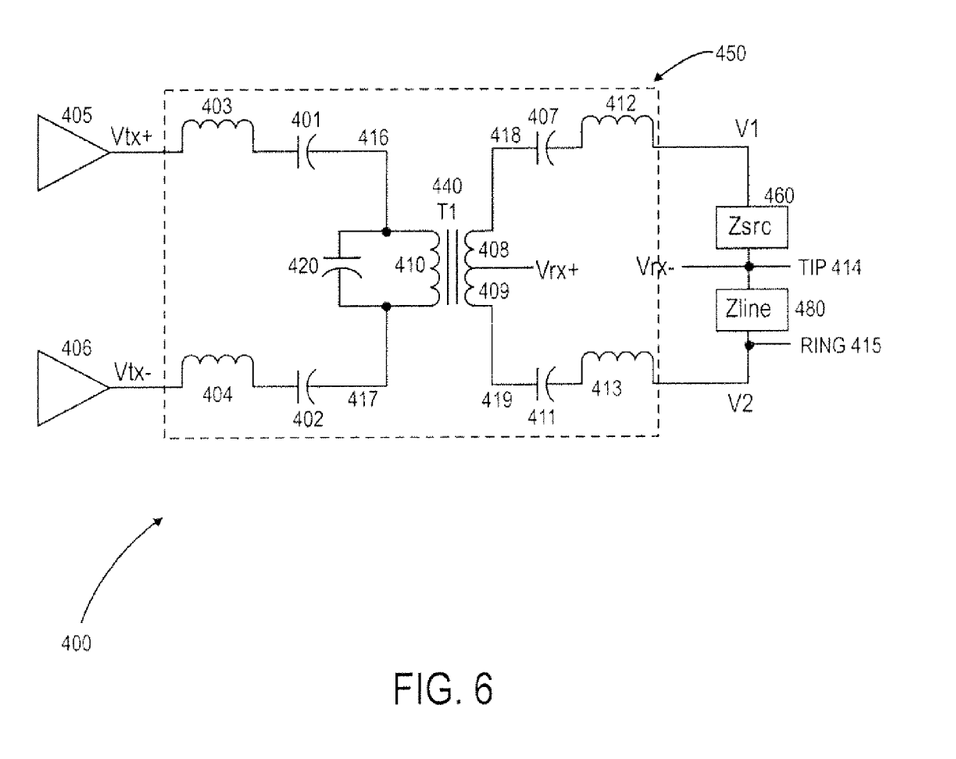
FIG. 6 is a schematic diagram illustrating an embodiment of a line interface circuit.

FIG. 6 illustrates a schematic diagram of a line interface circuit having an impedance component on the line side according to one embodiment. In an embodiment, referring to FIG. 6, a line interface circuit 400, such as an xDSL modem line interface circuit 210 of FIG. 3, may include components a filter 450 coupled to drivers 405 and 406 for driving impedance 460 and 480 of lines 414-415. Filter 450 may be implemented as any one of the filters shown in FIGS. 5A-5D. In one embodiment, filter 450 may be an odd order bandpass filter or an even order band-pass filter according to certain embodiments. In this example, by way of illustration and not by way of limitation, filter 450 is a third order band pass filter and utilizes LC as components of the filter. In one embodiment, filter 450 may be implemented and integrated with a transformer 440, for example, for isolation purposes. In a particular embodiment, transformer 440 includes a center inductor 410 implemented as part of a T1 transformer 440 magnetically coupled to windings 408 and 409 which are equal.

The line interface circuit 400 may be used to drive impedance Zsrc 460 and Zline 480. Zline 480 represents the impedance of the line as seen at nodes TIP 414 and RING 415. Zsrc 460 represents the impedance of a complex impedance network. Zsrc 460 is designed and built to be substantially equal to Zline 480. In one embodiment, transformer 440 may have two or more windings such as a first winding 408 and a second winding 409 on the line side, a third winding 410 on the driver side, and may be approximately center tapped on the line side. A one to one windings ratio may exist between the windings 408, 409 on the line side.

In one embodiment, a first leg 416 of the third winding 410 may be coupled to a first capacitor 401. The first capacitor 401 may be coupled to a first inductor 403, forming a LC component of filter 450 according to one embodiment. The inductor 403 may be coupled to an output of the first complimentary transmit driver/amplifier 405. A second capacitor 420 may be coupled to the nodes of the third winding 410 of the transformer 440. A second leg 417 of the third winding 410 may be coupled to a third capacitor 402. The third capacitor 402 may be coupled to a second inductor 404, and the inductor 404 may be coupled to an output of the second complimentary transmit driver/amplifier 406 according to one embodiment.

A third leg 418 of the first winding 408 may be coupled to a fourth capacitor 407. The fourth capacitor 407 may be coupled to a third inductor 412, and the third inductor 412 may be coupled to Zsrc, an impedance component 460, and the impedance component 460 may be coupled to the TIP wire 414 of the Plain Old Telephone System line, according to one embodiment of the invention. A fourth leg 419 of the second winding 409 may be coupled to a fifth capacitor 411. The fifth capacitor 411 may be coupled to a fourth inductor 413, and the fourth inductor 413 may be coupled to Zline the line impedance 480 at the RING wire 414 of the Plain Old Telephone System (POTS) line. The impedance component 460 approximately matches the impedance value of the line Zline to form a voltage divider with the line impedance, Zline. The impedance matching component provides cancellation of the transmit signal from the receive signal on the line side (e.g., from the view point of Vrx+ and Vrx−).

A transformer provides Telecommunications Network Voltage (TNV) isolation. In one embodiment, the transformer 440 is relatively center tapped to generate relatively equivalent inductance between windings 408 and 409. If the filter 450 is terminated symmetrically with respect to Vrx+ and Vrx− and the output legs are impedance balanced, according to one embodiment, V1 and V2 may be equi-potential symmetrical about Vrx+ and Vrx−. This embodiment also shows the filter 450 with the addition of a differential source, Vtx+ and Vtx−, driving the filter input and a termination network in the bridge configuration.

In operation, according to one embodiment, the first transmit driver/amplifier 405 generates Vtx+. The second transmit driver/amplifier 406 generates Vtx−. Vtx+ and Vtx− make up a complimentary differential transmit signal, and Vrx+ and Vrx− are the receive signals. The resulting bridge-configured hybrid with line side cancellation is typically fed from an at least a third order band-pass filter. As a result, the transmit signal may be nulled as seen from the receive nodes Vrx+ and Vrx− (assuming Zsrc matches Zline, and that the output legs are impedance balanced).

In one embodiment, impedance matching component 460 may include any combination of a resistor, a capacitor, or an inductor. In a particular embodiment, the impedance matching component 460 may include one resistor and one capacitor. In an embodiment, the impedance matching component 460 may not be made to perfectly match the impedance value of the line, Zline, under all conditions but the impedance component 460 may be made close enough to achieve a better trans-hybrid loss result.

In an embodiment, the T1 transformer 440 may have a leakage and magnetizing inductances. Also the T1 transformer 440 may not be linear. To the extent that the T1 transformer 440 is non-ideal, the line side voltages may vary slightly as a function of frequency from the driver voltages. The impedance component 460 being on the line side may match impedance by working directly against the line to provide cancellation of the transmit signal without being obscured by the non-ideal properties of the T1 transformer 440. In an embodiment, the filter on the driver side, which may be a band-pass filter, may be configured to substantially nullify the receive signals leaking into the transmit side. Other configurations may exist.

Figure 7:
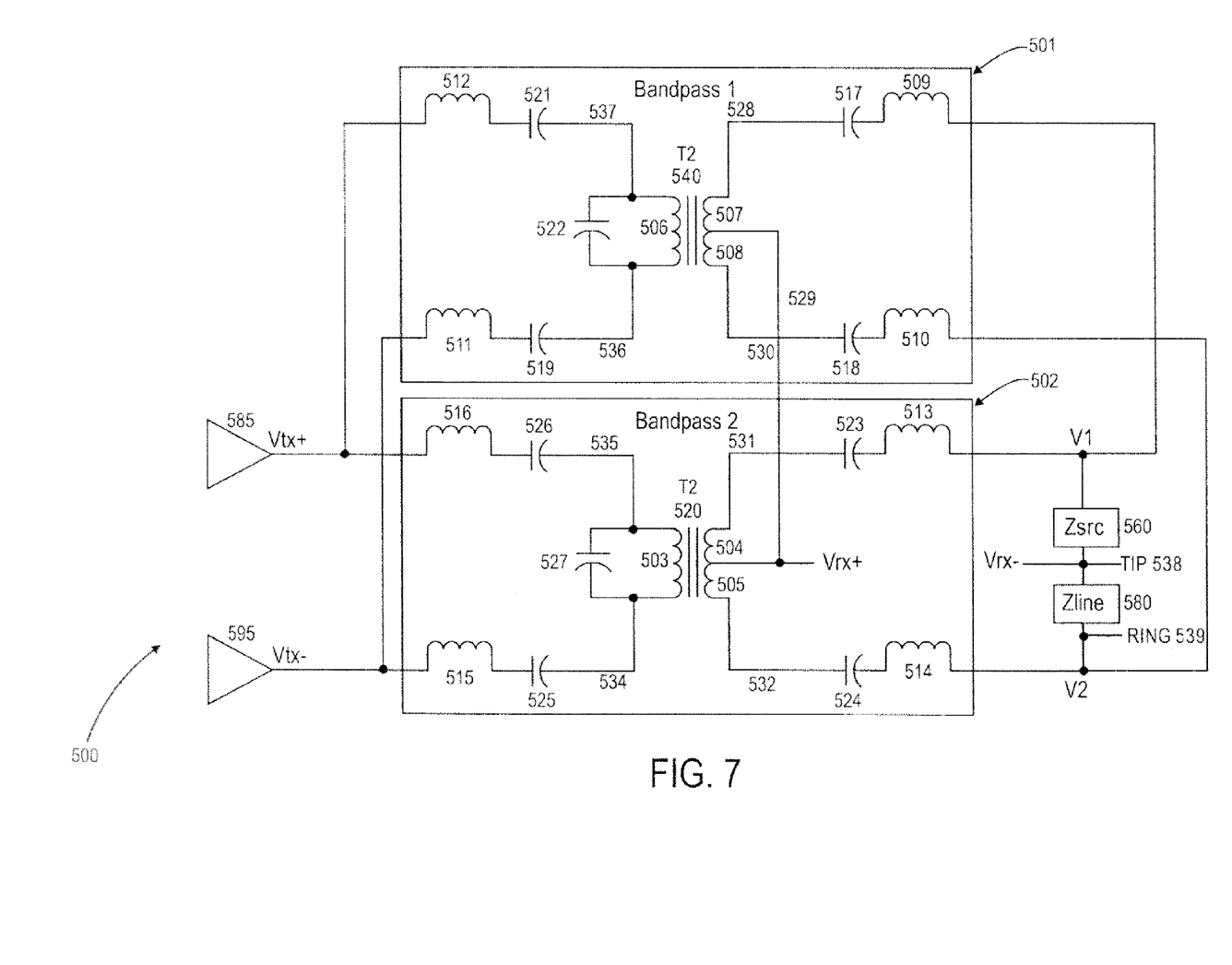
FIG. 7 is a schematic diagram illustrating another embodiment of a line interface circuit.

FIG. 7 is a schematic diagram illustrating a line interface circuit of a communication device according to one embodiment of the invention. In this embodiment, as shown in FIG. 7, multiple filters (e.g., band-pass filters) may be utilized in a line interface circuit, each corresponding to a transmit band. For example, any one of the filters may be implemented as filter 450 of FIG. 6. Although two filters are utilized on two transmit bands, more or less filters and transmit bands may also be applied.

In an embodiment, two filters 501 and 502, which may be band-pass filters as set forth above, may feed a common bridge-configured hybrid with line side termination. The line interface circuit 500 may include, but is not limited to, transmit transformers 520 and 540, where the transmit transformers 520 and 540 may be integrated into filters 501 and 502 according to certain embodiments of the invention. In one embodiment, filter 502 may have a transformer 520 having a first, second and third windings 503, 504, 505 forming a first through fourth inductor 509, 510, 511, 512 and coupled to a first through fifth capacitors 517, 518, 519, 521, 522 respectively.

In one embodiment, filter 501 may have a transformer 540 having a first, second and third windings 506, 507, 508 forming a first through fourth inductor 513, 514, 515, 516 and coupled to a first through fifth capacitor 523, 524, 525, 526, 527 respectively. In addition the line interface circuit 500 may include a first transmit driver/amplifier 585, a second transmit driver/amplifier 595, and an impedance component Zsrc 560.

The transmit transformer 540 may have a first winding 506 on the driver side, a second and third windings 507 and 508 on the line side. In one embodiment, transformer 540 may be center tapped on the line side. Similarly, the transmit transformer 520 may have a first winding 503 on the driver side, a second and third winding 504 and 505 on the line side. The transformer 520 may be center tapped on the line side, forming a terminal Vrx+. A one to one winding ratio may exist between the windings 507, 508 and between the windings 504, 505 on the line side.

In one embodiment, a first leg 537 of the first winding 506 of transformer 540 may be coupled to a first capacitor 521. The capacitor 521 may be coupled to a first inductor 512, and the inductor 512 may be coupled to the output of the first complimentary transmit driver/amplifier 585. Similarly, according to an alternative embodiment, a second leg 536 of the first winding 506 of the transformer 540 may be coupled to a third capacitor 519. The capacitor 519 may be coupled to a second inductor 511, and the inductor 511 may be coupled to the output of the second complimentary transmit driver/amplifier 595. A second capacitor 522 may be coupled to the nodes of the first winding 506 of the transformer 540. According to a further embodiment, a third leg 528 of the second winding 507 of the transformer 540 may be coupled to a fourth capacitor 517. The capacitor 517 may be coupled to a third inductor 509, and the inductor 509 may be coupled to Zsrc, an impedance component 560, and the impedance component 560 may be coupled to the TIP wire 538 of the Plain Old Telephone System line. A fourth leg 529 may be coupled to a point between the windings 507, 508 of transformer 540 and a point between the windings 504, 505 of transformer 520. A fifth leg 530 of the third winding 508 of the transformer 540 may be coupled to fifth capacitor 518. The capacitor 518 may be coupled to a fourth inductor 510, and the inductor 510 may be coupled to Zline the line impedance 580 at the RING wire 539 of the Plain Old Telephone System line.

In one embodiment, a first leg 535 of the first winding 503 of the transformer 520 may be coupled to a first capacitor 526. The capacitor 526 may be coupled to a first inductor 516, and the inductor 516 may be coupled to the output of the first complimentary transmit driver/amplifier 585. The second leg 534 of the first winding 503 of the transformer 520 may be coupled to third capacitor 525. The capacitor 525 may be coupled to a second inductor 515, and the inductor 515 may be coupled to the output of the second complimentary transmit driver/amplifier 595. A second capacitor 527 may be coupled to the nodes of the first winding 503 of the transformer 520. A third leg 531 of the second winding 504 of the transformer 520 may be coupled to a fourth capacitor 523. The capacitor 523 may be coupled to a third inductor 513, and the inductor 513 may be coupled to Zsrc, an impedance component 560, and the impedance component 560 may be coupled to the TIP wire 538 of the Plain Old Telephone System line. A fourth leg 529 may be coupled to a point between the windings 504, 505 of transformer 520 and between the windings 507, 508 of transformer 540. A fifth leg 532 of the third winding 505 of the transformer 520 may be coupled to a fifth capacitor 524. The capacitor 524 may be coupled to a fourth inductor 514, and the inductor 514 may be coupled to Zline the line impedance 580 at the RING wire 539 of the Plain Old Telephone System line.

The impedance component 560 couples to the transformers 520, 540 on the line side of the line interface circuit 500. The impedance component 560 approximately matches the impedance value of the line to form a voltage divider with the line impedance, zline 580. The impedance matching component provides cancellation of the transmit signal from the receive signal on the line side.

V1, V2, and Vrx+ are common nodes between the filters 501 and 502. Each filter's output legs form a separate bridge with Zsrc 560 and Zline 580 in common. Assuming the output legs of each filter are impedance balanced, receive cancellation at common nodes Vrx+ and Vrx− will occur from each transmit source.

In one embodiment, each filter applies to a separate transmit frequency band. These frequency bands are spaced apart so that a receive band may be sandwiched between the transmit bands. As a result, they are far enough apart in frequency so as to not appreciably load each other.

Again, although two filters are shown, the concept can be extended to three or more filters and each filter may be used for a specific band. In addition, although 3rd order filters are shown, a filter of any odd order could be used. This is because odd order filters end with a series element, and the series element is what provides the impedance isolation between filters. In an embodiment, the filters on the driver side, which may be band-pass filters, may be configured to substantially nullify the receive signals leaking into the transmit side.

Note that although one driver is shown in FIG. 7, it will be appreciated that multiple drivers may be implemented. In one embodiment, multiple drivers may be implemented to driver multiple transmit filters respectively. This is typically useful in the cases that separate drivers or amplifiers may be optimized differently for each transmit frequency band. In certain embodiments, separate amplifiers may be even driven by different DACs (digital-to-analog converters). Other configurations may exist.

Figure 8:
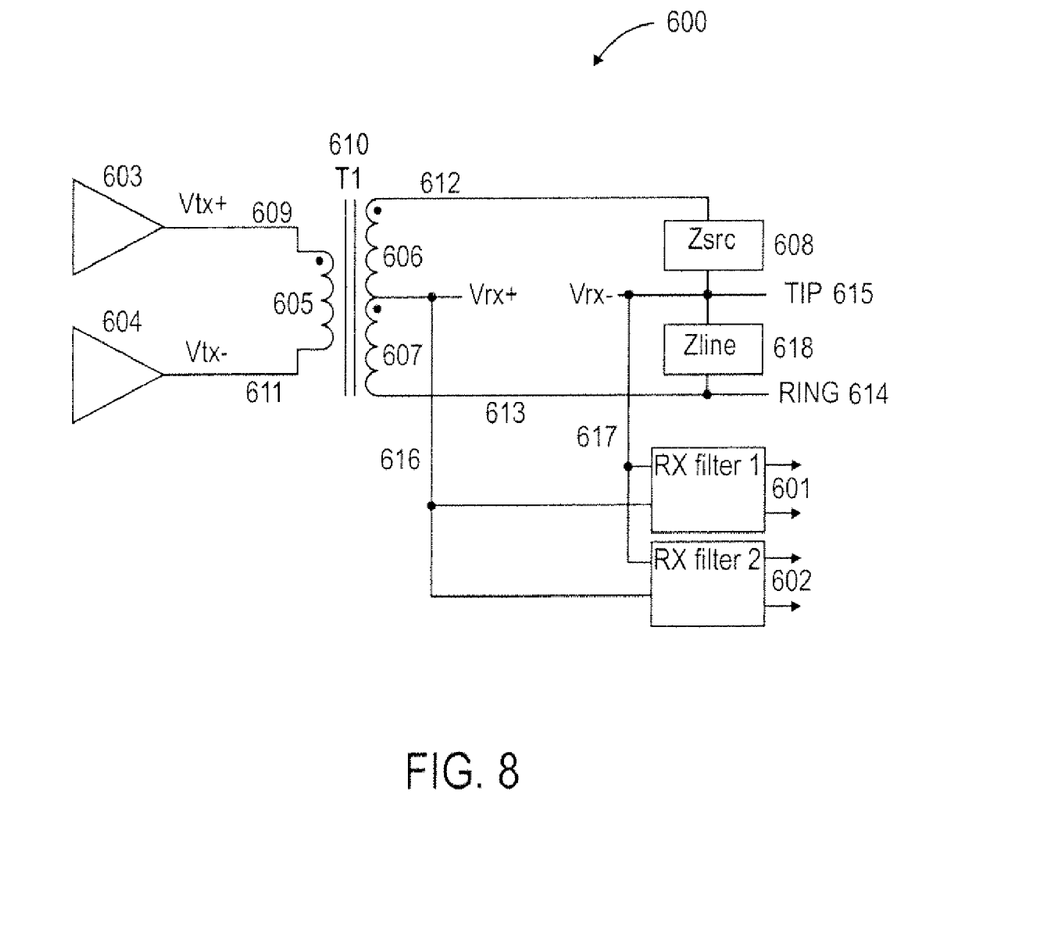
FIG. 8 is a schematic diagram illustrating another embodiment of a line interface circuit.

FIG. 8 is a schematic diagram illustrating a line interface circuit according to another embodiment of the invention. In an embodiment, to a line interface circuit may include multiple receive filters, each corresponding to a receiving band. In an embodiment a line interface circuit 600, such as an xDSL modem hybrid circuit, may include components such as receive filters 601 and 602, which may be a high-pass, low-pass, or bandpass filter. Alternatively, filters 601 and 602 may be implemented similar to filters 501 and 502 as described in FIG. 7. The line interface circuit 600 may also include components such as T1 transformer 610 having a first, second and third winding 605, 606 and 607, a first transmit driver/amplifier 603, a second transmit driver/amplifier 604, an impedance component 608 and receive filters 601 and 602.

In one embodiment, T1 transformer 610 may have a first winding 605 on the driver side, a second winding 606 on the line side and a third winding 607 on the line side. Transformer 610 may also be center tapped on the line side. A one to one windings ratio may exist between the windings 606, 607 on the line side. In a particular embodiment, a first leg 609 of the first winding 605 may be coupled to a first transmit driver/amplifier 603. A second leg 611 of the first winding 605 may be coupled to a second transmit driver/amplifier 604. A third leg 612 of the second winding 606 may be coupled to the impedance component 608. The impedance component 608 may be coupled to the TIP wire of the Public Switched Telephone Network. A fourth leg 613 of the third winding 607 may be coupled to Zline the line impedance 618 at the RING wire 614 of the PSTN line. In one embodiment, one end of a fifth leg 616 may be coupled to a point between the windings 606 and 607 and the other end may feed into filters 601 and 602. One end of a sixth leg 617 may be coupled to the TIP of a PSTN and the other end may feed into filters 601 and 602. Differential inputs Vrx+ and Vrx− may be fed to the filters 601 and 602 through a node on fifth leg 616 and a node on sixth leg 617. Vrx+ is a common node between the second and third winding of transformer 610. Vrx− is a node on the TIP 615 of the Public Switched Telephone Network. Differential voltages Vrx+ and Vrx− feed into receive filters 601 and 602.

This is useful for systems like VDSL that employ multiple receive bands. Separately filtering for each receive band can help the dynamic range requirements for these systems. This circuit works by exploiting the fact that the impedance seen looking into a bridge is a weak function of the impedance across the null point, if the bridge is balanced or nearly balanced. In this case, that means that the impedance seen by TIP and RING looking into the bridge does not change much even if more receive filter loads are added, so long as the bridge is relatively balanced. Although not shown, according to one embodiment, the receive filters are typically capacitively coupled as well as transformer coupled for TNV isolation.

Since transmit is almost completely decoupled from receive in this topology, multiple transmit and multiple receive filters can be used simultaneously as desired. In an embodiment, the presence or absence of a filter may be selectable through a switch element or by component population options. This topology lends itself nicely because the basic configuration doesn't change with the addition or removal of a transmit or receive filter.

Although only two receive filters are discussed above, in an embodiment, any number of filters can be used in the above application. Also according to one embodiment, multiple transmit filters and multiple receive filters may be used in combination. Each filter combination may be configured for a specific frequency band in view of a transmit band and a receive band. Other configurations may exist.

Figure 9:
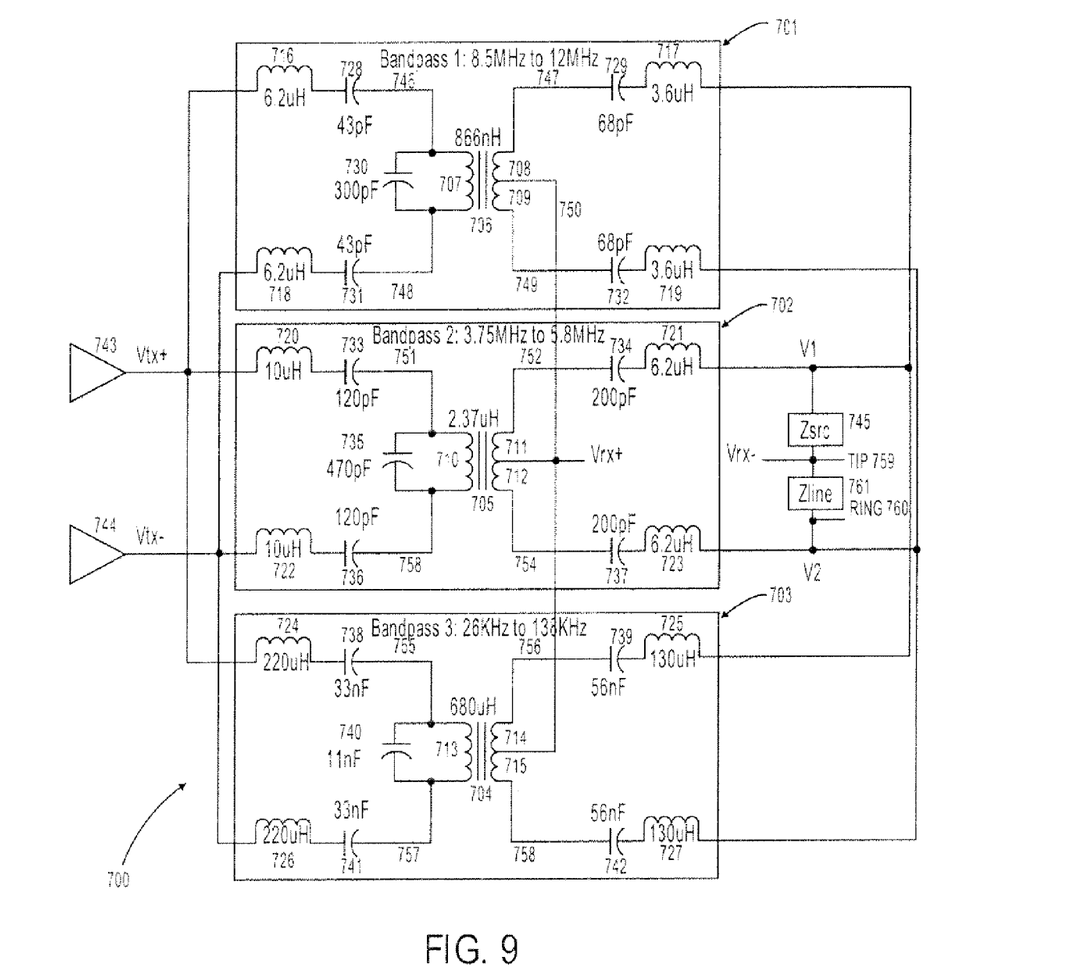
FIG. 9 is a schematic diagram illustrating another embodiment of a line interface circuit.

FIG. 9 is a schematic diagram of a line interface circuit according to a particular embodiment of the invention. Note that the values of the components as shown are illustrated by way of examples and not by way of limitations. Other components or other values may also be implemented. In this embodiment, referring to FIG. 9, a line interface circuit 700 may have three filters. Filter 701 may be a band-pass filter with pass frequencies approximately from 8.5 MHz to 12 MHz, filter 702 may be a bandpass filter with pass frequencies approximately from 3.75 MHz to 5.8 MHz and filter 703 may be band-pass filters with pass frequencies approximately from 26 KHz to 138 KHz. Filters 701, 702 and 703 may feed into a common bridge-configured hybrid with line side termination. The line interface circuit 700 may include components such as a transmit transformer 704 that may have an inductance of approximately 680 uH, a transmit transformer 705 that may have an inductance value of approximately 2.37 uH and a transmit transformer 706 that may have an inductance value of approximately 866 nH. Transformer 704, 705 and 706 may be integrated in filters 701, 702 and 703.

Filter 701 may have a transformer 706 having a first, second and third windings 707-709 forming a first through fourth inductors 716-719 respectively. For example, inductor 716 may have an inductance of approximately 6.2 uH, inductor 717 may have an inductance of approximately 3.6 uH, inductor 718 may have an inductance of approximately 6.2 uH, inductor 719 may have an inductance of approximately 3.6 uH. Filter 701 further includes a first through fifth capacitor 728-732. For example, capacitor 728 may have a capacitance of approximately 43 pF, capacitor 729 may have a capacitance of approximately 68 pF, capacitor 730 may have a capacitance of approximately 300 pF, capacitor 731 may have a capacitance of approximately 43 pF and capacitor 732 may have a capacitance of approximately 68 pF.

Filter 702 may have a transformer 705 having a first, second and third windings 710-712 forming a first through fourth inductor 720-723. For example, inductor 720 may have an inductance of approximately 10 uH, inductor 721 may have an inductance of approximately 6.2 uH, inductor 722 may have an inductance of approximately 10 uH, inductor 723 may have an inductance of approximately 6.2 uH. Filter 702 includes a first through fifth capacitors 733-737. For example, capacitor 733 may have a capacitance of approximately 120 pF, capacitor 734 may have a capacitance of approximately 200 pF, capacitor 735 may have a capacitance of approximately 470 pF, capacitor 736 may have a capacitance of approximately 120 pF, capacitor 737 may have a capacitance of approximately 200 pF.

Filter 703 may have a transformer 704 having a first, second and third windings 713-715 forming a first through fourth inductors 724-727. For example, inductor 724 may have an inductance of approximately 220 uH, inductor 725 may have an inductance of approximately 130 uH, inductor 726 may have an inductance of approximately 220 uH, inductor 727 may have an inductance of approximately 130 uH. Filter 703 may include a first through fifth capacitors 738-742. For example, capacitor 738 may have a capacitance of approximately 33 nF, capacitor 739 may have a capacitance of approximately 56 nF, capacitor 740 may have a capacitance of approximately 11 nF, capacitor 741 may have a capacitance of approximately 33 nF, capacitor 742 may have a capacitance of approximately 56 nF.

In addition, the line interface circuit 700 may include a first transmit driver/amplifier 743, a second transmit driver/amplifier 744, and an impedance component Zsrc 745.

The transmit transformer 706 may be center tapped on the line side and may have the first winding 707 on the driver side, the second and third windings 708 and 709 on a line side. Also the transmit transformer 705 may be center tapped on the line side and may have the first winding 710 on the driver side, the second and third windings 711 and 712 on the line side. Similarly, the transmit transformer 704 may be center tapped on the line side and may have the first winding 713 on the driver side and the second and third windings 714 and 715 on the line side. A one to one winding ratio may exist between the windings 708 and 709, between the windings 711 and 712, and between the windings 714 and 715, on the line side.

A first leg 746 of the first winding 707 of the transformer 706 may be coupled to capacitor 728. The capacitor 728 may be coupled to inductor 716, and inductor 716 may be coupled to the output of the first complementary transmit driver/amplifier 743. A second leg 748 of the first winding 707 of the transformer 706 may be coupled to the capacitor 731. The capacitor 731 may be coupled to the inductor 718, and the inductor 718 may be coupled to the output of the second complimentary transmit driver/amplifier 744. A third leg 747 of the second winding 708 of the transformer 706 may be coupled to the capacitor 729. The capacitor 729 may be coupled to the inductor 717, and the inductor 717 may be coupled to Zsrc, an impedance component 745, and the impedance component 745 may be coupled to the TIP wire 759 of the Plain Old Telephone System line. A fourth leg 750 may coupled to a point between the windings 708, 709 of the transformer 706, a point between the windings 711 and 712 of transformer 705, and a point between the windings 714, 715 of transformer 704. A fifth leg 749 of the third winding 709 of the transformer 706 may be coupled to a fifth capacitor 732. The capacitor 732 may be coupled to a fourth inductor 719, and the inductor 719 may be coupled to Zline, the line impedance 761, at the RING wire 760 of the Plain Old Telephone System line. Capacitor 730 may be coupled to the nodes of the first winding 707 of the transformer 706.

A first leg 751 of the first winding 710 of the transformer 705 may be coupled to capacitor 733. The capacitor 733 may be coupled to an inductor 720, and the indictor 720 may be coupled to the output of the first complementary transmit driver/amplifier 743. A second leg 753 of the first winding 710 of the transformer 705 may be coupled to capacitor 736. The capacitor 736 may be coupled to an inductor 722, and the inductor 722 may be coupled to the output of the second complimentary transmit driver/amplifier 744. A third leg 752 of the second winding 711 of the transformer 705 may be coupled to a capacitor 734. The capacitor 734 may be coupled to an inductor 721, and the inductor 721 may be coupled to Zsrc, an impedance component 745, and the impedance component 745 may be coupled to the TIP wire 759 of the Plain Old Telephone System line. A fourth leg 750 may coupled to a point between the windings 711, 712 of the transformer 705, a point between the windings 708, 709 of transformer 706, and a point between the windings 714, 715 of transformer 704. A fifth leg 754 of the third winding 712 of the transformer 705 may be coupled to a capacitor 737. The capacitor 732 may be coupled to an inductor 723, and the inductor 723 may be coupled to Zline, the line impedance 761, at the RING wire 760 of the Plain Old Telephone System line. Capacitor 735 may be coupled to the nodes of the first winding 710 of the transformer 705.

A first leg 755 of the first winding 713 of the transformer 704 may be coupled to a capacitor 738. The capacitor 738 may be coupled to an inductor 724, and the inductor 724 may be coupled to the output of the first complimentary transmit driver/amplifier 743. A second leg 757 of the first winding 713 of the transformer 704 may be coupled to a capacitor 741. The capacitor 741 may be coupled to an inductor 726, and the inductor 726 may be coupled to the output of the second complimentary transmit driver/amplifier 744. A third leg 756 of the second winding 714 of the transformer 704 may be coupled to a capacitor 739. The capacitor 739 may be coupled to an inductor 725, and the inductor 725 may be coupled to Zsrc, an impedance component 745, and the impedance component 745 may be coupled to the TIP wire 759 of the Plain Old Telephone System line. A fourth leg 750 may coupled to a point between the windings 714, 715 of the transformer 704, a point between the windings 711 and 712 of transformer 705, and a point between the windings 708, 709 of transformer 706. A fifth leg 758 of the third winding 715 of the transformer 704 may be coupled to a capacitor 742. The capacitor 742 may be coupled to an inductor 727, and the inductor 727 may be coupled to Zline, the line impedance 761, at the RING wire 760 of the Plain Old Telephone System line. Capacitor 740 may be coupled to the nodes of the first winding 713 of the transformer 704.

The impedance component 745 approximately matches the impedance value of the line, Zline 761, to form a voltage divider with the line impedance, zline 761. The impedance matching component may provide cancellation of the transmit signal from the receive signal on the line side.

V1, V2, and Vrx+ are common nodes between the filters 701, 702 and 703. Each filter's output legs form a separate bridge with Zsrc 745 and Zline 761 in common. Assuming the output legs of each filter are impedance balanced, receive cancellation at common nodes Vrx+ and Vrx− will occur from each transmit source. In one embodiment, the line interface of FIG. 9 operates similar to that of FIG. 7.

Thus, a line interface circuit with line side cancellation of a communication device has been described herein. In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A communication device, comprising:
   a line interface circuit for interfacing a communication line, including
      a driver to drive a plurality of transmit signals onto the communication line over a plurality of transmit frequency bands respectively, and
      a plurality of transmit filters coupled to the driver, each transmit filter being associated with a different one of the plurality of transmit frequency bands.

2. The device of claim 1, wherein the driver comprises a plurality of differential drivers to drive the plurality of transmit filters respectively.

3. The device of claim 1, wherein the plurality of transmit filters includes a first transmit filter and a second transmit filter associated with a first and a second transmit frequency bands respectively, wherein the first and second transmit filters are configured to block interference noise between transmit signals of the first and second transmit frequency bands.

4. The device of claim 1, wherein at least one of the transmit filters is a band-pass filter having a center frequency associated with at least one transmit frequency band of the line interface circuit.

5. The device of claim 4, wherein the band-pass filter is an odd order band-pass filter having at least three orders.

6. The device of claim 1, wherein the communication device is a DSL (digital subscriber line) compatible modem.

7. A communication device, comprising:
   a line interface circuit for interfacing a communication line, comprising:
      a driver to drive a plurality of transmit signals onto the communication line over a plurality of transmit frequency bands respectively, and
      a plurality of transmit filters coupled to the driver, each transmit filter being associated with one of the plurality of transmit frequency bands, wherein at least one of the transmit filters is a band-pass filter having a center frequency associated with at least one transmit frequency band of the line interface circuit, wherein the band-pass filter comprises a first inductive/capacitive (LC) component and a second LC component, wherein the first LC component is coupled to the driver on a driver side of the line interface circuit, and wherein the second LC component is coupled to at least one of the line impedance and the impedance component of the line side of the line interface circuit.

8. The device of claim 7, wherein the first LC component is coupled to the driver in series and wherein the second LC component is coupled to at least one of the line impedance and the impedance component in series.

9. The device of claim 7, wherein the band-pass filter further comprises a third LC component coupled to the first and second LC components, and wherein the third LC component is coupled to the driver side and the line side of the line interface circuit in parallel.

10. The device of claim 9, wherein the third LC component of the band-pass filter comprises an inductor forming a transformer isolating the driver side from the line side.

11. A communication device, comprising:
    a line interface circuit, having a line impedance, for interfacing a communication line, comprising:
       a driver to drive a plurality of transmit signals onto the communication line over a plurality of transmit frequency bands respectively;
       a plurality of transmit filters coupled to the driver, each transmit filter being associated with one of the plurality of transmit frequency bands;
       a receiver coupled to a line side of the line interface circuit to receive a receive signal over a receive frequency band; and
       an impedance component coupled to the line side to approximately match the line impedance to cancel a leakage from at least one transmit signal with respect to the receive signal.

12. The device of claim 11, wherein at least one of the transmit filters is integrated with a transformer isolating the line side from a driver side of the line interface circuit, wherein the driver side includes the driver and the line side includes the receiver and impedance component.

13. The device of claim 11, wherein the line interface circuit further comprises a receive filter coupled to the receiver for filtering the receive signal, and wherein the receive filter is configured to block interference noise from the receive signal to at least one of the transmit signals.

14. The device of claim 13, wherein the receiver comprises a plurality of receive components for receiving a plurality of receive signals having a plurality of receive frequency bands respectively, and wherein the receive filter comprises a plurality of receive filtering components, each receive filtering component corresponding to one of the receive frequency bands.

15. The device of claim 14, wherein the plurality of receive filtering components includes a first and second receive filtering components corresponding to a first and a second receive frequency bands respectively, wherein the first and second receive filtering components are configured to block interference noise between receive signals of the first and second receive frequency bands.

16. A method performed by a communication device, comprising:
    driving a plurality of transmit signals from a driver side of a line interface circuit onto a communication line over a plurality of transmit frequency bands respectively; and
    filtering each of the transmit signals from a line side of the line interface circuit using a plurality of transmit filters respectively, each transmit filter being associated with a different one of the plurality of transmit frequency bands.

17. The method of claim 16, wherein the plurality of transmit filters includes a first and second transmit filters associated with a first and second transmit frequency bands respectively, wherein the method further comprises the first and second transmit filters blocking interference between transmit signals of the first and second transmit frequency bands.

18. A method performed by a communication device, comprising:
  driving a plurality of transmit signals from a driver side of a line interface circuit onto a communication line over a plurality of transmit frequency bands respectively;
  filtering each of the transmit signals from a line side of the line interface circuit using a plurality of transmit filters respectively, each transmit filter being associated with one of the plurality of transmit frequency bands;
  receiving a receive signal from the communication line; and
  providing an impedance component to approximately match a line impedance of the communication line, wherein the matched impedance component and the line impedance cancel a leakage from at least one transmit signal with respect to the receive signal.

19. A communication device, comprising:
  a line interface circuit for interfacing a communication line, including
    a transmitter to transmit a transmitting signal onto the communication line,
    a plurality of receivers to receive a plurality of receiving signals from the communication line over a plurality of receiving frequency bands respectively, and
    a plurality of receiving filters, each coupled to one of the receivers to filter a corresponding different one of the plurality of receiving signals of a corresponding receiving frequency band.

20. The device of claim 19, wherein the plurality receiving filters are configured to block interference among the plurality of receiving signals.

21. The device of claim 19, wherein at least one of the receiving filters is configured to block interference of at least one receiving signal to the transmitting signal.

22. The device of claim 19, wherein the line interface circuit further comprises a transmitting filter coupled to the transmitter to filter the transmitting signal, and wherein the transmitting filter is integrated with a transformer to isolate the transmitter with at least one of the receivers.

* * * * *